(12) United States Patent
Kim et al.

(10) Patent No.: US 9,015,791 B2
(45) Date of Patent: Apr. 21, 2015

(54) METHOD OF MANAGING WEB APPLICATION POLICY USING SMART CARD, AND WEB SERVER AND MOBILE TERMINAL FOR IMPLEMENTING THE SAME

(75) Inventors: Hae Young Kim, Seoul (KR); Chae Un Kang, Seoul (KR); Young Min Lee, Goyang-si (KR); Un Hae Chun, Anyang-si (KR)

(73) Assignee: KT Corporation, Seongnam-si (KR)

( * ) Notice: Subject to any disclaimer, the term of this patent is extended or adjusted under 35 U.S.C. 154(b) by 626 days.

(21) Appl. No.: 13/333,618

(22) Filed: Dec. 21, 2011

(65) Prior Publication Data
US 2012/0159569 A1 Jun. 21, 2012

(30) Foreign Application Priority Data
Dec. 21, 2010 (KR) .......................... 10-2010-0131961

(51) Int. Cl.
*G06F 17/00* (2006.01)
*G06F 7/04* (2006.01)
*H04L 29/06* (2006.01)
*G06K 5/00* (2006.01)
*G06K 7/01* (2006.01)
*G06F 21/62* (2013.01)
*G06F 21/60* (2013.01)
*H04M 1/725* (2006.01)

(52) U.S. Cl.
CPC .............. *G06F 21/62* (2013.01); *G06F 21/604* (2013.01); *H04L 63/20* (2013.01); *H04M 1/72561* (2013.01)

(58) Field of Classification Search
USPC ............. 726/1, 9, 26; 713/165, 166; 235/375, 235/382, 382.5
See application file for complete search history.

(56) References Cited

U.S. PATENT DOCUMENTS

2007/0006289 A1* 1/2007 Limont et al. ................... 726/6
2009/0305687 A1* 12/2009 Baldan .......................... 455/419

* cited by examiner

*Primary Examiner* — Aravind Moorthy
(74) *Attorney, Agent, or Firm* — Sughrue Mion, PLLC

(57) ABSTRACT

A method of managing policy information in a mobile terminal by requesting an external policy management server for information about whether a change has been made to policy information and updating the policy information in a smart card web server of the mobile terminal to control access to resources based on the updated policy information.

5 Claims, 3 Drawing Sheets

METHOD OF MANAGING WEB APPLICATION POLICY USING SMART CARD, AND WEB SERVER AND MOBILE TERMINAL FOR IMPLEMENTING THE SAME

CROSS REFERENCE TO RELATED APPLICATION

This application claims priority from Korean Patent Application No. 10-2010-0131961, filed on Dec. 21, 2010 in the Korean Intellectual Property Office, the disclosure of which is hereby incorporated by reference in its entirety.

BACKGROUND

1. Field

Methods and apparatuses consistent with exemplary embodiments relate managing a policy in a mobile terminal and, more particularly, to a method of managing the policy of a web application using the smart card of a mobile terminal.

2. Description of the Related Art

A policy denotes a series of sentences that define how to allocate resources to individual clients. Here, a client may be a personal user, a department, a host computer, an application, or the like. Resources may be allocated based on the time of day, the priority of client authority, the availability of resources, and other factors. A policy or policy declaration is made by a manager and is stored in policy reservoir. Management software searches and uses policies when making a decision. In the present specification, policies refer to policies which use a web application as a client.

A web application policy needs to be updated to suit variations in the policy or changes in conditions. In some cases, a policy is decided on such that an application using terminal resources obtains a user's permission when using specific resources (for example, a network, an address book, etc.). For example, when the application tries to use terminal resources requiring the verification of security, it is determined whether to permit the use of the relevant resources on the basis of the policies in which the use of the relevant resources should be permitted, denied or permitted conditionally after receiving the user confirmation.

However, the above policies can be changed depending on the circumstances. Further, depending on applications, a user may desire to change a relevant policy. For example, in the case of a navigation application using a Global Positioning System (GPS), an approval is mainly requested whenever the application is used, and it is impossible for the user to optionally change such a policy.

In the prior art, the update of a web application policy on, for example, Android™ terminals may be performed using two methods. Firstly, there is a method in which, at the time of updating firmware, an update file is manually downloaded onto a desktop computer and is then updated using the booting menu of the terminal. Secondly, there is a method in which, at the time of upgrading a system using an Over the Air (OTA) function, a policy is automatically updated, wherein a connection to a 3rd Generation (3G) or Wireless Fidelity (WiFi) network is required.

However, the conventional update methods are characterized in that when a system or firmware is updated, the update of the policy can be incidentally performed, so that it is difficult to dynamically update a policy and it is also difficult to change and adjust the detailed policies related to a specific application.

SUMMARY

Accordingly, keeping in mind the above problems occurring in the conventional methods, aspects of exemplary embodiments provide a convenient method for managing the policy of an application on mobile terminal resources on the basis of web technology.

According to an aspect of an exemplary embodiment, there is provided a policy management method which is suitable for dynamically updating policies related to the applications of a mobile terminal.

According to an aspect of an exemplary embodiment, there is provided a policy management method which can change and adjust detailed policies for respective applications of a mobile terminal.

According to an aspect of an exemplary embodiment, there is provided a web server and a mobile terminal, which execute the above-described policy management method.

In accordance with an aspect of an exemplary embodiment, there is provided a method of managing policy information in a mobile terminal, including: transmitting, by a mobile terminal, to an external policy management server an inquiry about whether policy information has been changed from a current version of the policy information; receiving a response that indicates whether the policy information has been changed from the current version to a next version of the policy information; determining whether the response indicates that the policy information has been changed from the current version to the next version of the policy information; in response to determining that the policy information has been changed from the current version to the next version of the policy information, updating the policy information in a smart card web server of the mobile terminal from the current version to the next version; and controlling access of an application to a resource based on the next version of the policy information.

Preferably, at the inquiring, the mobile terminal and the external policy management server may communicate with each other using a web protocol.

Preferably, the controlling may include, i executing the application; inquiring, by a web platform of the mobile terminal, the smart card web server about whether the next version of the policy information indicates a change has been made to a policy related to the application; and in response to determining the next version of the policy information indicates that the change has been made to the policy related to the application, the web platform downloading a changed policy.

Preferably, the policy information may be policy information related to resources of the mobile terminal.

Preferably, the controlling may include, receiving from the application a request to access the resource; and determining whether to permit or deny the requested access based on the next version of the policy information.

In accordance with an aspect of an exemplary embodiment, there is provided a computer-readable recording medium having embodied thereon computer-readable codes which, when executed by a computer, cause the computer to execute a smart card web server (SCWS), wherein the SCWS is configured to enable communication using a web protocol and to control access to a resource of a mobile terminal based on policy information related to the resource as a local host.

Preferably, the computer-readable medium is a smart card of the mobile terminal.

Preferably, the SCWS may communicate with an external policy management server, and the SCWS may be accessed by a browser of the mobile terminal.

In accordance with an aspect of an exemplary embodiment, there is provided a mobile terminal, including a memory that stores a smart card web server (SCWS) of the mobile terminal, the SCWS configured to control access to a resource of the mobile terminal based on policy information related to the resource as a local host and a web platform that communicates with the SCWS in the mobile terminal using a web protocol.

Preferably, the web platform may transmit to an external policy management server an inquiry about whether a policy has been changed from a current version of the policy, and updates the policy to a next version of the policy in the web server in response to receiving information that indicates the policy has been changed from the current version to the next version.

Preferably, the web platform may determine whether to permit an application to access the resource based on the policy information in response to receiving a request to access the resource received from the application.

BRIEF DESCRIPTION OF THE DRAWINGS

The above and other aspects of the exemplary embodiments will be more clearly understood from the following detailed description, taken in conjunction with the accompanying drawings, in which.

DESCRIPTION OF THE EXEMPLARY EMBODIMENTS

Hereinafter, exemplary embodiments will be described in detail with reference to the attached drawings.

According to an aspect of the exemplary embodiments, there is provided a method of dynamically managing a policy using a web server is embedded in a smart card (hereinafter referred to as a 'Smart Card Web Server: SCWS'). The smart card is provided with memory for storing information about an application (for example: a banking application) or an address book, as does external memory.

The 'SCWS' may be mounted on a smart card and may be implemented in the form of a web server application. Since the SCWS is a web server, the SCWS is not directly connected to an application, but the SCWS communicates with a web application, such as a browser, via a web protocol (Hyper Text Transfer Protocol: HTTP).

Further, the SCWS may be accessed via the browser of a terminal, similar to a typical web server, or may be externally accessed when an official Internet Protocol (IP) is assigned to a relevant Universal Subscriber Identity Module (USIM).

For example, a web browser may implement a service, which is implemented on a terminal, as a web service in such a way as to access the SCWS and search an address book, without creating the service in the form of a separate application, and the SCWS may be externally accessed (for example, a website such as Google or Naver may provide a user-customized page to the SCWS in a push service form).

The term 'web platform' used in the present specification denotes a middleware platform capable of executing an application created on the basis of web technology. A platform, such as a Wireless Internet Platform for Interoperability (WIPI) or a Java platform, executes an application created in C or the Java programming language, whereas the web platform executes an application created using a web language, such as HyperText Markup Language (HTML), JavaScript language, or Cascading Style Sheets (CSS) language. Recently, specifications for web applications have been standardized in World Wide Web Consortium (W3C) widget standards, Wholesale Application Community (WAC) device standards, etc. The term 'web platform' denotes a middleware platform that executes such a web application. Further, since the term 'web platform' is a middleware platform having the functionality of being capable of working in conjunction with a browser, the web platform concept may include the browser.

The above-described web platform is capable of communicating with an external server over a suitable network using web technology.

Meanwhile, the term 'policy' in the present specification is used as a policy having a typical meaning in the art to which the specification pertains. That is, a policy defines a method of suitably allocating the resources of the mobile terminal to individual web applications.

Figure 1:
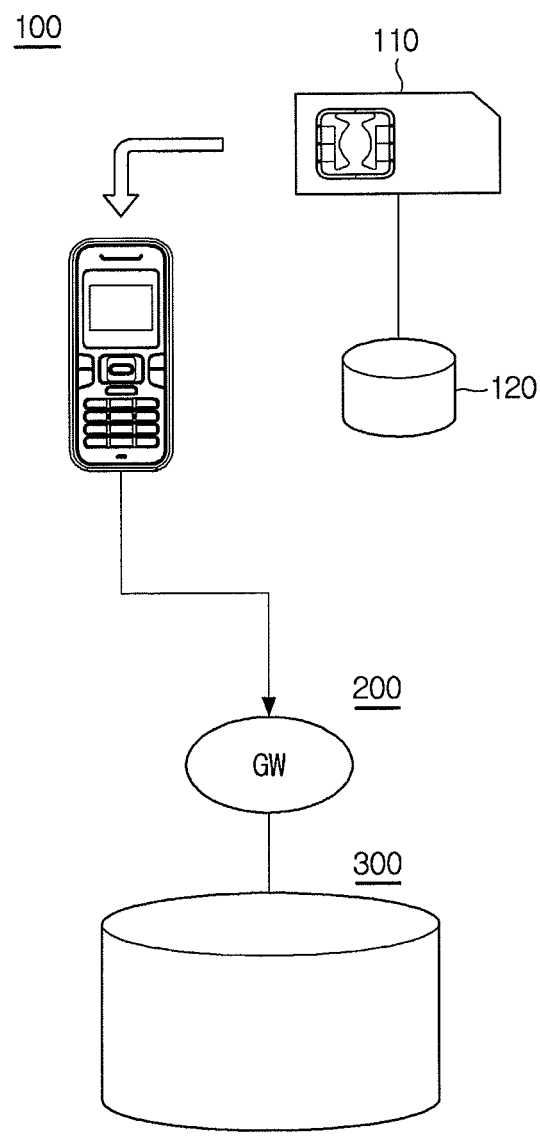
FIG. 1 is a diagram schematically showing the construction of a system for performing a policy management method according an exemplary embodiment.

FIG. 1 is a diagram showing the construction of a system for implementing a policy management method according to an exemplary embodiment.

Referring to FIG. 1, a mobile terminal 100 includes a smart card 110. The smart card 110 may be embedded in the terminal to be either detachably mounted or fixedly mounted. Typically, the smart card 110 is provided with an 8-bit or 32-bit microprocessor, a chip Operating System (OS), and a memory. The smart may be a Unversal Subscriber Identity Module (USIM) generally employed in a mobile phone or the like. Typically, a USIM is composed of a small-sized Central Processing Unit (CPU) and a memory. Part of the memory may be provided as a space for an SCWS 120, which will be described later.

Further, the smart card 110 may be implemented as any type of smart card, for example, a contact type based on a contact point, a contactless type in which a Radio Frequency (RF) signal is used and in which communication is performed via an antenna, and a hybrid type in which the advantages of both types are combined. Furthermore, the smart card 110 may include an executable application, such as a banking application, and may store information, such as an address book.

In the exemplary embodiment, the smart card 110 includes the SCWS 120. The SCWS 120 functions as a local host. The SCWS 120 may perform communication using a web protocol, similar to a typical web server, and may preferably be implemented in the form of a web server application.

Figure 2:
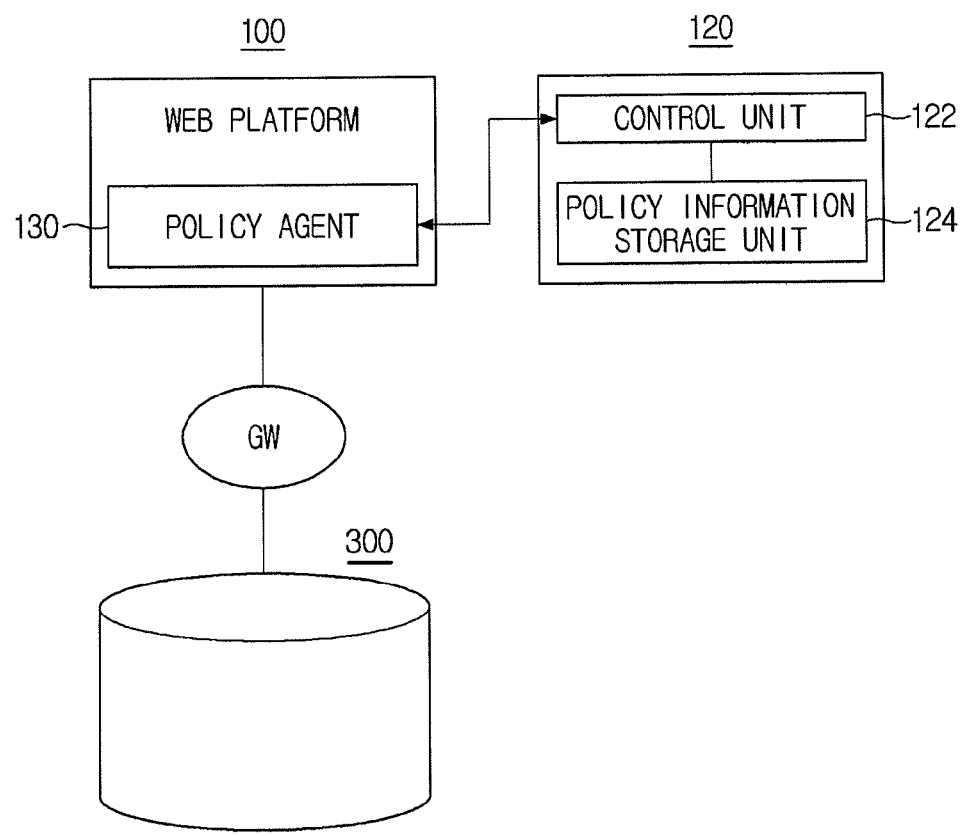
FIG. 2 is a diagram illustrating the function blocks of the system for performing the policy management method according to an exemplary embodiment.

FIG. 2 is a diagram illustrating a system for implementing the policy management method on the basis of the function blocks of the SCWS 120 according to an exemplary embodiment. As shown in FIG. 2, the SCWS 120 may include a control unit 122 and a policy information storage unit 124. The control unit 122 inquires the policy information storage unit 124 about policy information related to a relevant application when a request to access a specific resource is received from the relevant application. The control unit 122 transfers the policy information that was inquired about to a web platform. As shown in FIG. 2, the exemplary embodiment may include a separate policy agent 130 to manage policy information in the web platform. Alternatively, the policy agent 130 may be implemented as a part of the web platform. It is apparent to those skilled in the art that the policy agent 130 may be implemented in computer-readable software or as a part of the software.

In the policy information storage unit 124, application IDs and policy conditions related to the application IDs are listed to correspond to the individual terminal resources. In the exemplary embodiment, terminal resources include, for example, a user's geographical location (geolocation), Short Message Service (SMS), calls, viewing an address book, etc. Hardware resources related to the terminal resources include, for example, a Global Positioning System (GPS) receiver, a network, etc. The policy conditions refer to conditions related to whether to permit or deny the use of relevant resources, and define the rights to access relevant resources, such as "permitted only to an authenticated user", "not permitted to an unauthenticated user", and "permitted to an authenticated user after obtaining the authenticated user's confirmation by displaying a pop-up window related to whether to use relevant resources" in regard to, for example, 'user geolocation' resources.

Referring back to FIG. 1, the mobile terminal communicates with an external policy management server 300 via a gateway (for example, a Wireless Application Protocol (WAP) gateway 200). The policy management server 300 is a web server and is capable of communicating with the web platform of the mobile terminal 100 using a web protocol such as HTTP. The policy management server 300 may be implemented as a typical policy management server that is managed by a manager and is configured to manage the policy information of the terminal in an integrated manner. For example, the policy management server 300 includes policy storage for storing the policy information of the terminal 100.

Referring to FIG. 2, the policy information from the policy management server 300 is stored in the SCWS 120. Further, when the update of the policy information occurs, the policy information of the SCWS 120 is updated. The following Table 1 exemplifies terminal resources and policies on the terminal resources before and after being changed.

TABLE 1

| Terminal resources | Before changing policies | After changing policies |
|---|---|---|
| User's geolocation | (1) permitted only to an authenticated user (2) not permitted to an unauthenticated user | (1) permitted to an authenticated user (2) permitted to an unauthenticated user after obtaining the user's confirmation by displaying a pop-up window related to whether to use relevant resources |
| Sending an SMS message | (1) permitted to an authenticated user after obtaining the user's confirmation by displaying a pop-up window related to whether to use relevant resources (2) not permitted to an unauthenticated user | (1) permitted to an authenticated user without inquiry (2) permitted to an unauthenticated user after obtaining the user's confirmation by displaying a pop-up window related to whether to use relevant resources |

When the policy information is updated, the mobile terminal 100, which may be also referred to as the "web platform" hereinafter, receives the updated policy information from the policy management server 300, and transfers the updated policy information to the control unit 122 of the SCWS 120. When the updated policy information is transmitted from the policy management server 300, the control unit 122 updates relevant information in the policy information storage unit 124. Further, the control unit 122 may manage information indicating whether the policy information has been updated. For example, the update of the policy information may be managed according to the version of policy information.

When the version of the policy information is updated, the relevant policy information is transferred to the web platform and is reflected in the execution of an application.

Figure 3:
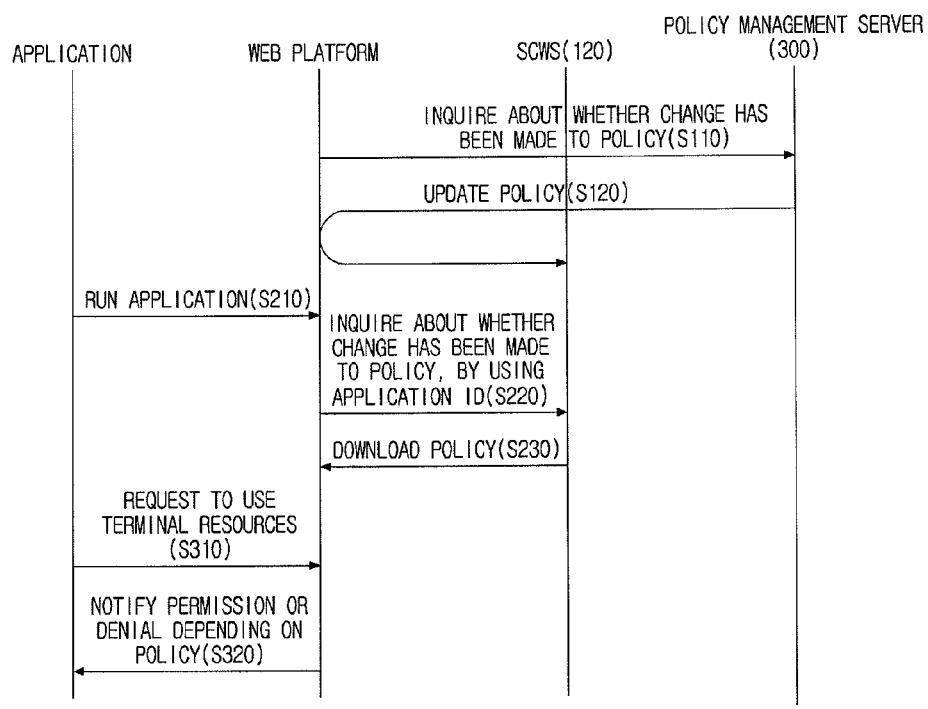
FIG. 3 is a flowchart showing a process for performing the policy management method according to an exemplary embodiment.

FIG. 3 is a flowchart showing a policy information management process implemented by the system of an exemplary embodiment.

Referring to FIG. 3, a typical procedure for downloading changed policy information in the SCWS will be described.

First, the web platform of the mobile terminal 100 inquires the policy management server 300 about whether a change has been made to a policy at step S110. For this operation, if necessary, the web platform may transmit information required to identify the version of the policy information that is currently being executed, or other pieces of policy information that are being executed, to the policy management server. If there has been a change made to the policy, the policy management server 300 transmits information about the changed policy to the mobile terminal 100, and the web platform updates the policy information of the SCWS 120 at step S120.

The above-described policy downloading performed by the SCWS 120 in regard to a relevant application may be conducted using information obtained from a typical application update procedure. For example, when the web platform updates a web application, a relevant update server may provide a notification that a policy file has been updated, and the web platform may update policy information related to the application on the basis of such notification.

Next, a method in which the web platform downloads updated policy information into the SCWS 120 will be described in detail with reference to FIG. 3.

When an application is running at step S210, the web platform inquires the SCWS 120 about whether a change has been made to the resource access policy of the application, by using the identification (ID) of the application at step S220. If a change has been made to the policy, the web platform downloads relevant policy information at step S230.

In the exemplary embodiment, the web platform communicates with the SCWS 120 using a web protocol. For example, when the policy information related to terminal resources is present in '/resource.policy' of the SCWS 120, the web platform may access 'http://localhost/resource-.policy' and then update a relevant policy file.

After the policy file has been downloaded, when the application requests access to the terminal resources at step S310, the web platform provides notification of whether to permit or deny the relevant application depending on corresponding policy information at step S320. For example, when the user requests access to a specific resource, but the web platform notifies the application that the application is not permitted to access the relevant resource, the application provides a suitable notification message, such as "this operation is not permitted", to the user. In contrast, when the application is permitted to access the resource, the application executes an operation required by the user.

Hereinbefore, the exemplary embodiment has been described based on an example in which a web platform inquires about a change in policy information, actively changes the policy information of the SCWS 120, and executes an application depending on the changed policy information. However, as described above, when an IP is assigned to the SCWS 120, the policy management server 300 can access the SCWS via the network using a web protocol. Therefore, the policy management server 300 may notify the SCWS 120 that a change in a policy related to a specific application has been made or that a change in a typical policy has been made. Furthermore, the policy management server 300 may transmit the changed policy information to the SCWS 120.

Further, although not especially described, those skilled in the art will appreciate that some or all of the individual procedures of the policy information management method and/or function blocks required to perform the procedures can be implemented by computer-readable software or hardware including physical circuits. Further, the above-described function blocks may be implemented in independent software, but those skilled in the art will appreciate that one or more function blocks may be integrated into a single type of software.

Although the exemplary embodiments have been described with reference to the attached drawings, the exemplary embodiments are not limited to only the described exemplary embodiments. Those skilled in the art can modify the exemplary embodiments, and these modifications are included in the scope of the present disclosure, without departing from the technical spirit of the disclose.

According to the exemplary embodiments, there is the advantage of being able to update policy information using the HTTP web protocol in a web platform on the basis of web technology without requiring a separate protocol for updating policy information, thus realizing excellent generality and scalability.

Further, the exemplary embodiments are advantageous in that, since variations in a policy related to the application of a mobile terminal can be dynamically considered, it is possible to change and adjust the detailed policies for respective applications of a mobile terminal, thus enabling the update of policies to be more freely performed.

What is claimed is:

1. A method of managing policy information in a mobile terminal, comprising:
    transmitting, by a mobile terminal, to an external policy management server an inquiry about whether policy information has been changed from a current version of the policy information;
    receiving a response that indicates whether the policy information has been changed from the current version to a next version of the policy information;
    determining whether the response indicates that the policy information has been changed from the current version to the next version of the policy information;
    in response to determining that the policy information has been changed from the current version to the next version of the policy information, updating the policy information in a smart card web server of the mobile terminal from the current version to the next version;
    executing an application of the mobile terminal according to the current version of the policy information;
    requesting the smart card web server of the mobile terminal whether the current version of the policy information is updated to the next version of the policy information;
    receiving the next version of the policy information from the smart card web server of the mobile terminal; and
    controlling execution of the application to access a resource based on the next version of the policy information.

2. The method according to claim 1, wherein the mobile terminal and the external policy management server communicate with each other using a web protocol.

3. The method according to claim 1, wherein the requesting comprises:
    inquiring, by a web platform of the mobile terminal, the smart card web server about whether the next version of the policy information indicates a change has been made to a policy related to the application.

4. The method according to claim 1, wherein the policy information is policy information related to resources of the mobile terminal.

5. The method according to claim 4, wherein the controlling comprises:
    receiving from the application a request to access the resource; and
    determining whether to permit or deny the requested access based on the next version of the policy information.

* * * * *